United States Patent [19]

Sato

[11] 4,258,402
[45] Mar. 24, 1981

[54] SMALL SIZE TAPE RECORDER WITH ADAPTER

[75] Inventor: Masaaki Sato, Hachioji, Japan

[73] Assignee: Olympus Optical Co., Ltd., Tokyo, Japan

[21] Appl. No.: 961,564

[22] Filed: Nov. 17, 1978

[30] Foreign Application Priority Data

Nov. 21, 1977 [JP] Japan ............................ 52/140530
Nov. 21, 1977 [JP] Japan ............................ 52/140531

[51] Int. Cl.³ ....................... G11B 5/00; G11B 15/12
[52] U.S. Cl. ....................................... 360/137; 360/61
[58] Field of Search ...................... 360/8, 137, 61

[56] References Cited

U.S. PATENT DOCUMENTS

| | | |
|---|---|---|
| 3,916,122 | 10/1975 | Sato et al. . |
| 3,934,267 | 1/1976 | Kosaka et al. . |
| 4,041,250 | 8/1977 | Sato . |
| 4,064,374 | 12/1977 | Sato . |
| 4,074,082 | 2/1978 | Sato et al. . |
| 4,119,813 | 10/1978 | Sato . |
| 4,120,009 | 10/1978 | Iwasawa ............................ 360/137 |

*Primary Examiner*—Vincent P. Canney
*Attorney, Agent, or Firm*—Weinstein & Sutton

[57] ABSTRACT

A tape recorder with adapter comprises a small size tape recorder including a playback function, a motor servo circuit and a low voltage and high capacity power supply. The small size tape recorder can be physically coupled with an adapter forming a variable speech control circuit or microcomputer circuit formed by IC or LSI components requiring a high voltage power supply. The adapter internally houses a high voltage and low capacity power supply.

6 Claims, 3 Drawing Figures

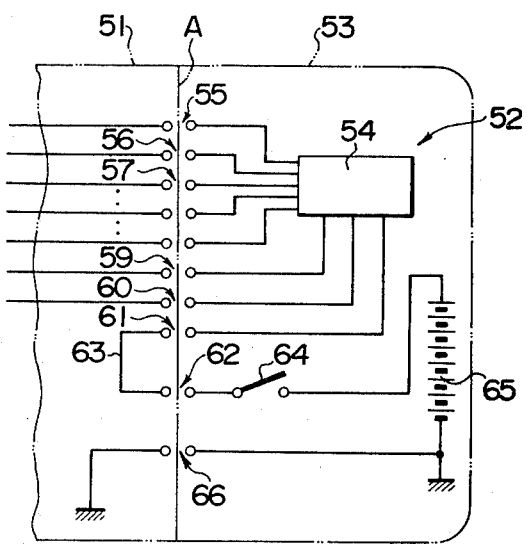
F I G. 3

SMALL SIZE TAPE RECORDER WITH ADAPTER

BACKGROUND OF THE INVENTION

The invention relates to a small size tape recorder with adapter, and more particularly, to such apparatus with an adapter which may comprise a variable speech control circuit for compressing or expanding the time axis of the recorded content or a microcomputer circuit.

The provision of additional functions in a small size tape recorder by coupling an adapter therewith has been already in practical use with a miniature-size tape recorder developed by the present applicant which employs a micro-cassette. In this instance, the inherent function of a tape recorder is minimized so that the entire assembly can be received in a pocket while allowing an operative coupling with an adapter to provide additional functions.

As is well known, the tape feed rate in a tape recorder is normally variable only within an extent from about +3% to −20% of a standard feed rate. If the feed rate changes as much as +50% or −25%, there occurs a considerable variation in the tone quality to present difficulties in hearing. A further variation as much as +100% or −50% will make the hearing impossible entirely. Hence, it is seen that it is impossible to improve the hearing efficiency by reducing the length of time which is required for the playback, by using a tape feed rate which is increased as much as +100%. On the other hand, it is also impossible to reduce the tape feed rate as much as −50% for purpose of stenographer's use.

Recently, a so-called variable speech control technique has been developed which compresses or expands the time axis of the recorded content by utilizing the redundancy of the speech, through a change of the tape feed rate and an adjustment of frequencies during the playback. Means which takes avail of the variable speech control includes a tape speed control knob which provides a control voltage which is applied to a motor control circuit to change the number of revolutions of a tape drive motor, thus changing the running speed of a magnetic tape. In addition, the control voltage is also applied to a pitch conversion circuit and also to a variable playback equalizer which compensates for a variation in the response of signals being reproduced which may be caused by a change in the tape speed. In this manner, the tape speed can be arbitrarily and continuously changed within a range from one-half to two and one-half times the standard rate.

When a tape speed which is twice as high as the standard rate is established, the signal reproduced by a playback head will have a doubled frequency while the playback time will be reduced to one-half. The reproduced signal is then passed through a preamplifier and the variable playback equalizer before it is applied to the pitch conversion circuit which processes the signal with a pitch conversion factor of ½ to restore the original pitch. The signal supplied from the pitch conversion circuit will be one-half times the original length of the recorded content which will be obtained when the tape runs at its standard rate. The restored content comprises a succession of segments which are obtained by splitting the original content into adjacent lengths and picking up one-half of each of them. In this manner, the redundancy of speech and non-recorded length of the tape can be cut off while assuring a satisfactory recognition of the content of the speech.

It is also known to use a programmed microcomputer circuit for automatic operation of the tape recorder. However, it is recognized that the variable speech control circuit or microcomputer circuit is formed by a plurality of IC or LSI components which require a high voltage source. These IC or LSI components which are commercially available are of a large size, having electrodes which are disposed at 0.1 inch pitch. This makes it difficult to assemble the variable speech control circuit into a small size tape recorder such as miniature tape recorder developed by the present applicant. The use of commercially available IC or LSI components is almost prohibitive since they require a high voltage and high capacity power supply.

It then may be contemplated to provide these circuits in the form of an adapter incorporating commercially available IC or LSI components. The adapter then must internally house a high voltage and low capacity power supply such as layer-built cells capable of supplying 6, 9 or 12 volts, as contrasted to a low voltage and high capacity power supply of the recorder which may comprise a pair of dry cells supplying 3 volts. A high voltage supply of a small size such as silver, alkali-manganese battery is available which can be used to operate both the tape recorder and IC or LSI components. However, the output amplifier and the motor contained within the tape recorder represent high power dissipation components, which cause such an expensive power supply to be rapidly exhausted, thus resulting in an increase in the cost. In addition, the battery must be frequently replaced. Where a separate power supply is provided to operate the adapter, there is a possibility that its power switch may be left closed when the adapter is not used, causing a wasteful dissipation of the power supply.

SUMMARY OF THE INVENTION

It is a first object of the invention to provide a small size tape recorder with an adapter such as a variable speech control circuit or microcomputer circuit incorporating IC or LSI components which require a high voltage power supply and wherein the recorder internally houses a low voltage and high capacity power supply inherently needed to operate the recorder while the adapter internally houses a high voltage and low capacity power supply required to operate the adapter circuit in a manner to enable a smooth operation of the combination of the recorder and the adapter.

It is a second object of the invention to provide a small size tape recorder with an adapter which constitutes a variable speech control circuit and wherein the usual recording and playback operation takes place without the adapter to maintain the recorder in its pocketable size form while allowing the adapter to be coupled therewith to provide an additional function.

In accordance with the invention, the tape recorder internally houses a low voltage, high capacity power supply to operate its amplifier and motor driven circuit while the adapter circuit incorporating IC or LSI components which require a high voltage source includes a high voltage, low capacity power supply such as may be provided by a layerbuilt battery and is constructed to be coupled with the tape recorder. This permits a proper function of respective circuits or circuit components while maintaining the tape recorder in a pocketable condition.

Since according to the invention, the tape recorder can be constructed to operate in a normal manner, it can be constructed in an inexpensive and compact manner. On the other hand, the adapter incorporates an expensive variable speech control circuit of an increased size and formed with IC or LSI components and an associated high voltage, low capacity power supply. Thus the adapter may be provided completely seprately from the tape recorder.

BRIEF DESCRIPTION OF THE DRAWINGS

FIG. 3 is a corresponding circuit diagram showing an adapter circuit which comprises a microcomputer circuit.

DESCRIPTION OF PREFERRED EMBODIMENT

Figure 1:
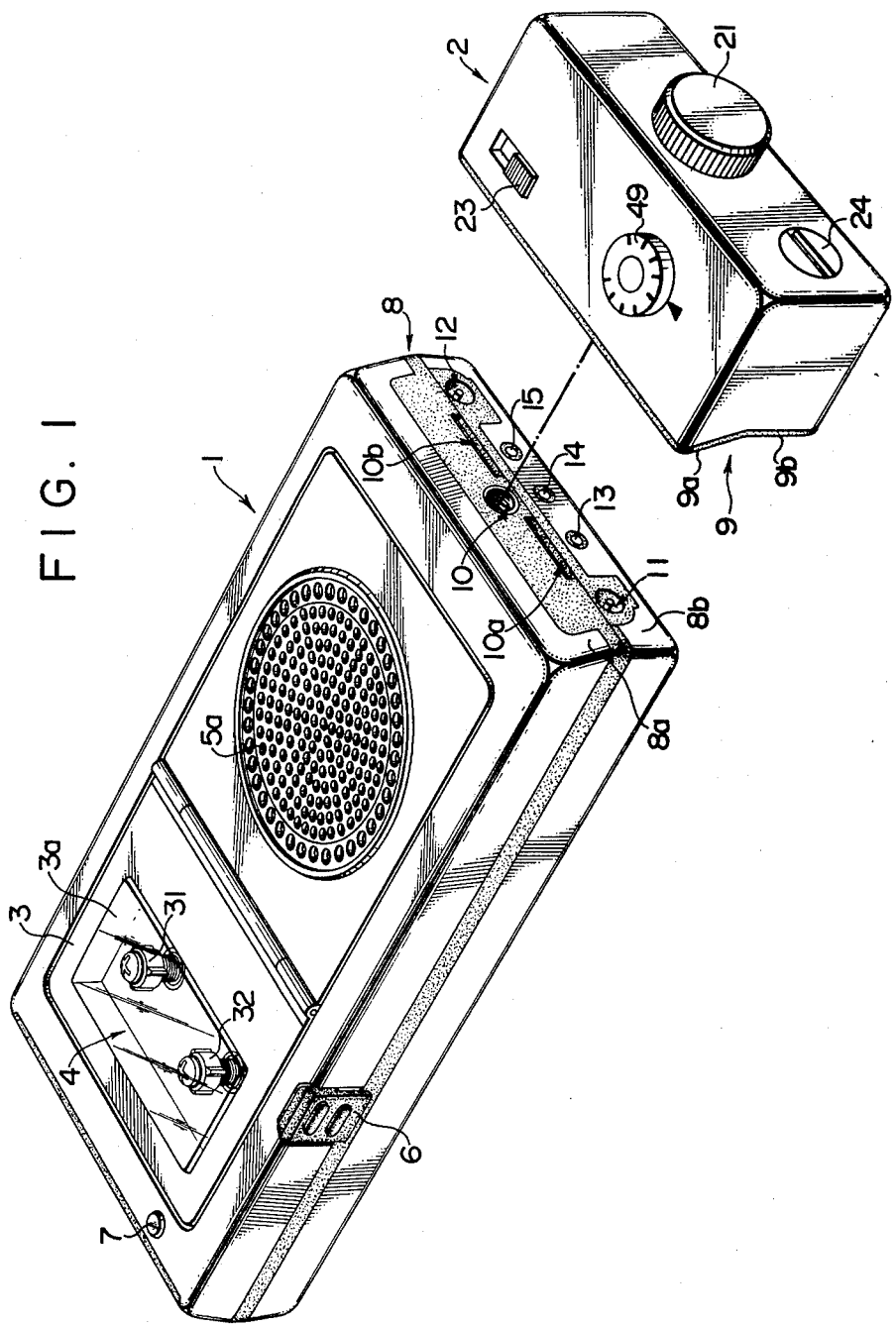
FIG. 1 is a perspective view of the small size tape recorder with adapter according to one embodiment of the invention.

Referring to FIG. 1, there is shown a miniature tape recorder 1 employing a micro-cassette which has been developed by the present applicant. An adapter 2 constructed as a variable speech control can be coupled with the recorder.

Adjacent to one end, the top of recorder 1 is formed with micro-cassette receiving chamber 4 closed by hinged coverplate 3 which is provided with sight window 3a. Loudspeaker 5 (see FIG. 2) is located below grille 5a adjacent to the other end of the recorder. As is well recognized, a micro-cassette (not shown) can be loaded in chamber 4 and a selected one of operating buttons (not shown) disposed on the right-hand wall of recorder 1 may be operated to establish a record or playback mode. Coverplate 3 can be opened or closed by operating an eject button 6 located on the left-hand sidewall of the recorder. During the record mode, lamp 7 disposed close to said one end of the recorder is lit. This lamp also flashes to indicate that the power supply internally housed within the recorder is nearly exhausted.

Adjacent to the said other end, the end face of recorder 1 is formed with coupler 8. Coupler 8 comprises a pair of inclined abutting surfaces 8a, 8b, female thread 10 and keyways 10a, 10b. Jacks 11, 12 and interconnecting terminals 13, 14, 15 are disposed in the surface 8b (see FIG. 2). Adapter 2 is provided with coupler 9 which comprises oppositely inclined abutting surfaces 9a, 9b of a complementary form which mate with the corresponding abutting surfaces 8a, 8b of coupler 8, and also with keys (not whown) which are adapted to fit in keyways 10a, 10b, and a fastening screw (not shown) which threadably engages female thread 10 of coupler 8. Knob 21 is disposed on the remote end of the fastening screw. Plugs 16, 17 and interconnecting terminals 18, 19, 20 are disposed on the abutting surface 9b. The adapter 2 can be coupled with and fastened to tape recorder 1 by engaging plugs 16, 17 and terminals 18, 19, 20 with corresponding jacks 11, 12 and corresponding terminals 13, 14, 15 while maintaining coupler 9 in abutment against coupler 8, and turning knob 21 to securely engage the screw with female thread 10.

Adapter 2 includes adapter circuit 22 (see FIG. 2) which effects a variable speech control to be described later. In FIG. 1, adapter 2 is provided with power switch 23 in its top surface, and is internally formed with a battery chamber (not shown) which is closed by plug 24. A high voltage, low capacity power supply 25 (see FIG. 2) as constructed by a layer-built battery such as an 006P battery or silver battery is contained in the battery chamber. Tape speed setting knob 49 is disposed on the top surface of adapter 2.

Figure 2:
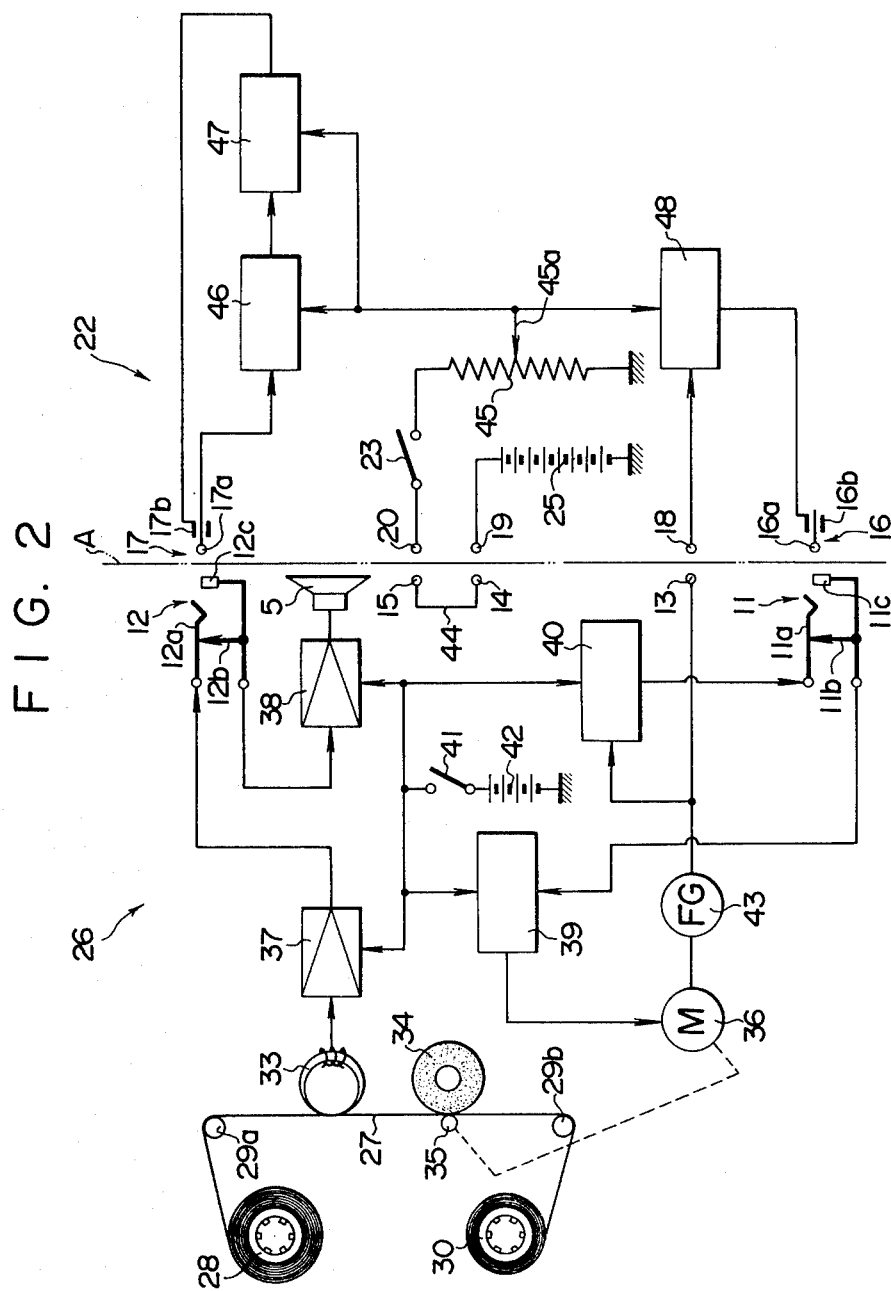
FIG. 2 is a circuit diagram of the electrical circuit of the tape recorder shown in FIG. 1 when the adapter is constructed as a variable speech control circuit.

FIG. 2 shows adapter circuit 22 and playback circuit 26 which is assembled into the recorder for cooperation with circuit 22. Circuits 22 and 26 are shown to the right and to the left of phantom line A, respectively. Thus it may be considered that the circuit shown to the left of phantom line A is contained within recorder 1 while the circuit shown to the right of phantom line A is received in adapter 2. The circuit portion which is utilized during the record mode of recorder 1 is omitted from illustration for the sake of brevity, but can be constructed in a conventional manner.

Referring to FIG. 2, magnetic tape 27 contained within a micro-cassette extends from tape hub 28 and around guide pins 29a, 29b which maintain it taut therebetween, and is then taken up by tape hub 30. It will be seen that the micro-cassette is loaded in the chamber 4 of recorder 1. Both hubs 28, 30 are engaged with tape supply shaft 31 and tape take-up shaft 32 (see FIG. 1), respectively, which are disposed within the chamber 4. When a playback button (not shown) is depressed, magnetic head 33 and pinch roller 34 move into the path of magnetic tape 27 as shown in FIG. 2 until head 33 bears against magnetic tape 27. Pinch roller 34 urges magnetic tape 27 against capstan 35. It will be understood that both capstan 35 and shaft 32 are adapted to be driven by motor 36, whereby capstan 35 is effective to feed magnetic tape 27 at a given rate by cooperation with pinch roller 34.

When disposed in abutment against magnetic tape 27 which is fed at a uniform rate, head 33 reproduces recorded information therefom. Head 33 is connected with pre-amplifier 37, the output of which is connected with resilient fixed contact 12a of jack 12. Jack 12 also includes movable contacts 12b, 12c. Movable contact 12b is maintained in engagement with fixed contact 12a when adapter 2 is not coupled with tape recorder 1, but is displaced therefrom when the components 1 and 2 are coupled together. Both movable contacts 12b, 12c are connected in common and with output amplifier 38, the output of which is connected with loudspeaker 5.

Preamplifier 37 and output amplifier 38 are connected with power supply 42 through main switch 41, together with motor current controlling transistor circuit 39 and motor speed control circuit 40. The supply 42 may comprise a pair of dry cells, for example, and represents a low voltage, high capacity power supply which is used exclusively by the minature tape recorder. Transistor circuit 39 is connected with motor 36, which is directly coupled with frequency generator 43 which is in turn connected with motor speed control circuit 40 and with terminal 13. Control circuit 40 is also connected with resilient fixed contact 11a of jack 11. Jack 11 also includes movable contacts 11b, 11c. Movable contact 11b is maintained in engagement with resilient fixed contact 11a when the adapter is not coupled with recorder 1, but is displaced therefrom when the adapter is connected with the latter. Both movable contacts 11b, 11c are connected in common and with transistor circuit 39.

In operation, when the adapter 2 is not coupled with recorder 1, the closure of main switch 41 and the depression of a playback button (not shown) place motor 36 in motion, whereby magnetic tape 27 begins to be fed. Information picked up by head 33 from magnetic tape 27 is fed through preamplifier 37 and output amplifier 38 to be given off acoustically from loudspeaker 5. The rotation of motor 36 is controlled by a servo loop comprising frequency generator 43, control circuit 40 and transistor circuit 39. Specifically, control circuit 40 operates through transistor circuit 39 to maintain a constant number of revolutions per unit time of motor 36 and hence a constant frequency output from frequency generator 43. In this manner, when adapter 2 is not coupled, motor 36 rotates at a given rate to feed magnetic tape 27 at a uniform rate.

Referring to the right-hand side of FIG. 2, adapter circuit 22 includes a high voltage, low capacity power supply 25 which is connected with terminal 19. Jumper wire 44 is connected across terminals 14, 15 contained within recorder 1, and hence terminal 19 can be connected with terminal 20 of power switch 23 through the jumper wire when the adapter 2 is coupled with the recorder 1. Power switch 23 is connected with variable resistor 45 which is mechanically coupled with knob 49. Resistor 45 includes slider 45a which is connected with variable playback equalizer 46, pitch conversion circuit 47, and motor speed control circuit 48, the latter providing a higher accuracy than control circuit 40 which is provided on the part of the tape recorder.

When adapter 2 is coupled with recorder 1, equalizer 46 is coupled with the output of preamplifier 37 through central terminal 17a of plug 17 and fixed contact 12a of jack 12. Simultaneously, pitch conversion circuit 47 is connected with the input of output amplifier 38 through ring-shaped outer terminal 17b of plug 17 and movable contact 12c of jack 12. Motor speed control circuit 48 is connected with the output of frequency generator 43 through terminals 18 and 13, and its output is connected with transistor circuit 39 through ring-shaped outer terminal 16b of plug 16 and movable contact 11c of jack 11. At this time, center terminal 16a of jack 16 remains idle, whereby control circuit 40, which is adapted to be connected therewith through fixed contact 11a of jack 11, remains inoperative.

When adapter 2 is coupled with recorder 1, power supply 25 provided on the part of the adapter is connected with adapter circuit 22 through jumper wire 44. When main switch 41 and power switch 23 are closed and the playback button (not shown) is depressed, motor 36 is set in motion to feed magnetic tape 27. Head 33 reproduces recorded information from magnetic tape 27 and feeds it to pre-amplifier 37. The output signal of preamplifier 37 is fed to equalizer 46. Equalizer 46 includes IC or LSI components and operates to compensate for a change in the frequency response which occurs when the feed rate of tape 27 is changed. Pitch conversion circuit 47 also incorporates IC or LSI components requiring a high voltage supply, and operates to control the rate and direction of a change in the time delay experienced through a bucket brigade device, thereby achieving the required pitch conversion. After the compression or expansion operation performed by the circuits 46, 47, the information signal is fed to output amplifier 38 to be acoustically given off by loudspeaker 5. At this time, the rotational speed of motor 36 is controlled by transistor circuit 39, which responds to a signal from control circuit 48 responding to both circuits 46, 47 so as to achieve a frequency output from frequency generator 43 which is suitable to the pitch conversion. By moving the slider 45a, the degree of the compression or expansion of the time axis can be controlled.

FIG. 3 illustrates a combination of minature tape recorder 51 and adapter circuit 52 formed as a microcomputer circuit which includes IC or LSI components requiring a high voltage supply. Circuit 52 includes microcomputer 54 having a number of output lines which are connected through terminals 55 to 60 with associated circuit elements contained within recorder 51. Microcomputer 54 can be connected with a high voltage, low capacity power supply 65 contained in the adapter through terminals 61, 62, which are short-circuited by jumper wire 63, and through power switch 64. Jumper wire 63 is contained within recorder 51, and hence microcomputer 54 cannot be connected with power supply 65 unless adapter 53 is coupled with recorder 51. It is to be noted that power supply 65 is also connected with the ground of recorder 51 through terminal 66.

When adapter 53 is coupled with recorder 51, it is possible to choose a selected musical piece by designating an address from a storage or to effect a paging to a selected tape portion or the display by means of a counter.

In the embodiments described above, jumper wires 44, 63 are connected in series with power switches 23, 64, respectively, so that the power supply 25, 65 can be connected with the adapter circuit 22, 53 when the adapter is coupled with the tape recorder. However, it will be seen that the use of such jumper wire can be avoided to control the connection of the power supply directly with power switch alone if due care paid to the opening or closing of the power switch.

What is claimed is:

1. A compact tape recorder apparatus having tape drive means, playback means for playing back information recorded in a tape and a first portable power supply especially designed for energizing only said tape drive means and said means for playing back information recorded on a tape;

an adapter;

first joining means on said tape recorder apparatus for receiving said adapter;

second joining means on said adapter for coupling with said first joining means;

recorder coupling means on said tape recorder apparatus for accepting said adapter to control an operation of said compact recorder apparatus, said coupling means including a plurality of recorder terminal means;

said adapter including controlling means for adjustably controlling the operating speed of said compact tape recorder apparatus tape drive means, said adapter also including a second portable power supply especially adapted for providing power to said adapter controlling means and a plurality of adapter terminal means for connecting to said plurality of recorder terminal means when said adapter is connected to said tape recorder apparatus, said adapter terminal means and said recorder terminal means electrically connecting said controlling means to said tape drive means and said playback means when said first and second joining means are coupled together;

said controlling means further including speech control circuit means for compressing or expanding the time axis of the playback information to correct for the speed adjustment provided by said controlling means; and said first and second power supplies being respectively housed in said recorder apparatus and said adapter and independently supplying power to their associated playback means and controlling means and having different voltage ratings, said first power supply being a low voltage, high capacity portable power source and said second power supply being a high voltage, low capacity portable power source.

2. The compact tape recorder apparatus according to claim 1 including a microcomputer circuit which permits playback of selected portions of said tape when said adapter is connected to said tape recorder apparatus.

3. The compact tape recorder apparatus according to claim 1 wherein said tape drive means and said controlling means each include motor speed control means, said motor speed control means within said adapter providing greater accuracy than said motor speed control means within said tape drive means, said recorder having a motor, said motor speed control means within said adapter being coupled to said motor in place of the motor speed control means within said tape drive means when said adapter is connected to said tape recorder apparatus.

4. The compact tape recorder apparatus according to claim 1 wherein said tape drive means comprises a tape drive motor and a speed control servo loop for controlling said tape drive motor, said speed control servo loop including a frequency generator connected to said tape drive motor, a motor speed control circuit responsive to an output from said frequency generator for developing a motor control signal and a motor current controlling transistor circuit responsive to said motor speed control signal for controlling the speed of said tape drive motor; and said frequency generator, said motor speed control circuit and said motor current controlling transistor circuit being interconnected to form said speed control servo loop for said tape drive motor.

5. The compact tape recorder apparatus according to claim 1 wherein said tape recorder apparatus comprises amplifier means and output means responsive to said amplifier means for developing audible sounds; and said controlling means comprises playback equalizer means and pitch conversion circuit means interconnected to said equalizer means, predetermined ones of said plurality of adapter terminal means and of said plurality of recorder terminal means cooperating when said adapter is connected to said tape recorder apparatus to connect said equalizer means to said amplifier means and to connect said pitch conversion circuit means to said output amplifier.

6. The compact tape recorder apparatus of claim 1 wherein said controlling means is an integrated circuit especially adapted for use with said high voltage, low capacity power supply.

* * * * *